United States Patent [19]

Kato

[11] Patent Number: 5,025,880
[45] Date of Patent: Jun. 25, 1991

[54] CAB LOCKING APPARATUS

[75] Inventor: Yuichi Kato, Yokohama, Japan

[73] Assignee: Ohi Seisakusho Co., Ltd., Kanagawa, Japan

[21] Appl. No.: 551,829

[22] Filed: Jul. 12, 1990

[30] Foreign Application Priority Data

Jul. 12, 1989 [JP] Japan .............................. 1-81901[U]

[51] Int. Cl.$^5$ .............................................. B62D 33/06
[52] U.S. Cl. .................................. 180/89.14; 292/216
[58] Field of Search .......................... 180/89.14, 89.15; 296/190; 292/216, 280; 49/395

[56] References Cited

U.S. PATENT DOCUMENTS

| 2,249,018 | 7/1941 | Marple et al. | 292/280 |
| 3,708,193 | 1/1973 | Caporicci | 292/280 |
| 4,413,696 | 11/1983 | Slocombe et al. | 180/89.14 |

FOREIGN PATENT DOCUMENTS 0022604  1/1981  Fed. Rep. of Germany ...... 292/216

Primary Examiner—Charles A. Marmor
Assistant Examiner—Michael Shaughnessy
Attorney, Agent, or Firm—Lowe, Price, LeBlanc and Becker

[57] ABSTRACT

A cab locking apparatus engages a striker on a chassis of a truck and holds a cab in a normal standing position, without allowing the cab to be forwardly inclined. To minimize the entire size of the apparatus and the total number of component elements, an input lever is located between a latch member, for engaging and disengaging the striker, and a locking plate, for retaining the latch member in a locking position. When the input lever is moved to a releasing operative position, the input lever is retained in a restricting/releasing holding groove in a base plate so that the latch member can be removed from the striker. When the latch member is engaged with the striker, the input lever is removed from the restricting/releasing holding groove so that the latch member is restricted in the locking position.

8 Claims, 4 Drawing Sheets

CAB LOCKING APPARATUS

BACKGROUND OF THE INVENTION

1. Field of the Invention

This invention relates to a cab locking apparatus for locking a cab, which is pivotally supported on a chassis frame and movable between a standing position and a forwardly inclined position, in the standing position by engagement with a striker, which is secured to the chassis frame downwardly of a rear end of the cab, so as to prevent the cab from moving toward the forwardly inclined position.

2. Description of the Related Art

A typical conventional cab locking apparatus of the described type is exemplified by Japanese Patent Publication No. 4708/1986. In the known cab locking apparatus, a latch member and a locking plate are pivotally mounted on a base plate. The latch member is pivotally movable between a locking position in which the latch member engages a striker and a unlocking position in which the latch member is removed from the striker. The locking plate is pivotally movable between a restriction position in which the locking plate prevents the latch member from being removed from the locking position and a releasing position in which the locking plate releases the latch member. A lock lever and an input lever are also pivotally mounted on the base plate. The lock lever is engageable with a lower end of the locking plate to hold the locking plate in the releasing. When the latch member is pivotally moved to the locking position, the input lever pushes the lock lever away from the locking plate against the biasing force so that the locking plate is pivotally moved from the releasing position to the restricting position.

It is desirable to minimize the size of a cab lock apparatus in order to increase the interior space and bed space of a cab to a maximum. Particularly the cab locking apparatus to be located under the cab should desirably have a reduced height.

However, with this prior cab locking apparatus, since the apparatus further includes a locking lever disposed downwardly of the locking plate, the apparatus has an increased height, which not only restricts the bed space to impair the inhabitability but also requires the lock lever and a spring to urge the lock lever, thus increasing the number of parts and hence the cost of production.

SUMMARY OF THE INVENTION

It is therefore an object of this invention to provide a cab locking apparatus which improves the inhabitability of a cab, increases the bed space and reduces the cost of production.

According to the invention, there is provided a cab locking apparatus for locking a cab, which is pivotally supported on a chassis frame and movable between a standing position and a forwardly inclined position, in the standing position by engagement with a striker, which is secured to the chassis frame downwardly of a rear end of the cab, so as to prevent the cab from moving toward the forwardly inclined position, the apparatus comprising: a base plate adapted to be supported on the chassis downwardly of the rear end of the cab; a latch member pivotally connected to the base plate and pivotally movable between a locking position in which the latch member is engaged with the striker and an unlocking position in which the latch member is removed from the striker, the latch member being normally urged from the locking position toward the unlocking position; a locking plate pivotally connected to the base plate and pivotally movable between a restricting position in which the locking plate prevents the latch member from being moved from the locking member, and a releasing position in which the locking plate releases the latch member, the locking plate being normally urged from the releasing position toward the restricting position; an input lever disposed between the latch member and the locking plate, which are vertically spaced apart, the input lever being movable between a locking operative position and a releasing operative position for pivotally moving the locking plate between the restricting position and the releasing position; and the base plate having a groove engageable with the input lever to hold the locking plate in the releasing position, when the input lever is moved from the locking operative position to the releasing operative position, so as to prevent the input lever from returning to the locking operative position, the groove being disengageable from the input lever to allow the locking plate to move from the releasing position to the restricting position under the biasing force when the latch member is pivotally moved from the unlocking position to the locking position.

In operation, as the cab is locked, the input lever is in the locking operative position, and the locking plate is held in the restricting position. The latch member is thereby held in the locking position to engage the striker.

Then when the input lever is moved from the locking operative position to the releasing operative position, the locking plate is pivotally moved from the restricting position to the releasing position. At that time, the input lever engages in the groove to hold the locking plate in the releasing position.

When the locking plate is pivotally moved from the restricting position to the releasing position, the latch member is brought from the locking position to the unlocking position under the biasing force, removing from the striker.

When the latch engages the striker, the input lever is then disengaged from the groove so that the locking plate is pivotally moved from the releasing position to the restricting position under the biasing force. As a result, the locking plate holds the latch in the locking position.

The above and other advantages, features and additional objects of this invention will be manifest to those versed in the art upon making reference to the following detailed description and the accompanying drawings in which a preferred structural embodiment incorporating the principles of this invention is shown by way of illustrative example.

DETAILED DESCRIPTION

Figure 1:
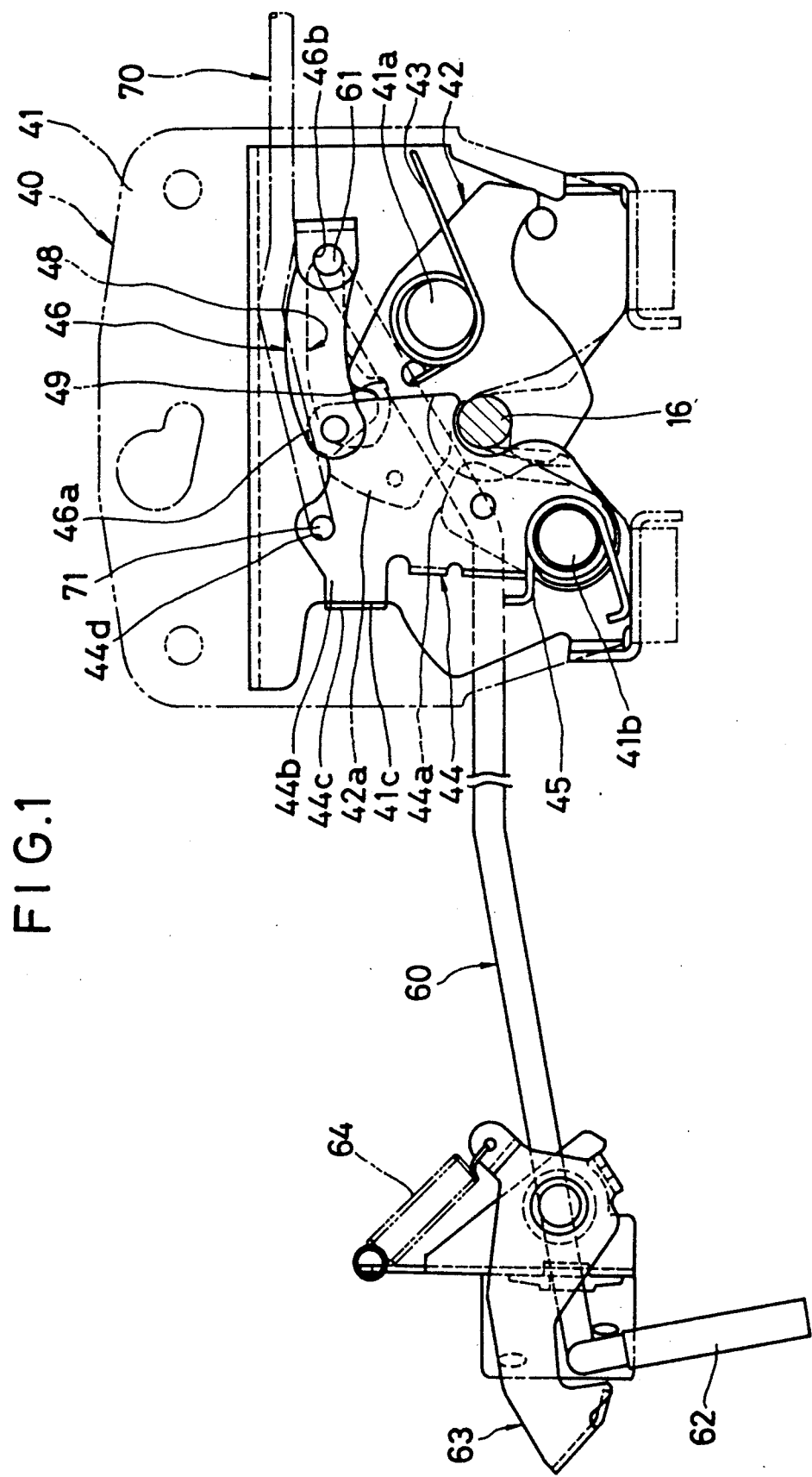
FIG. 1 is a front elevational view of a motive lock mechanism of a cab locking apparatus embodying this invention.
Figure 2:
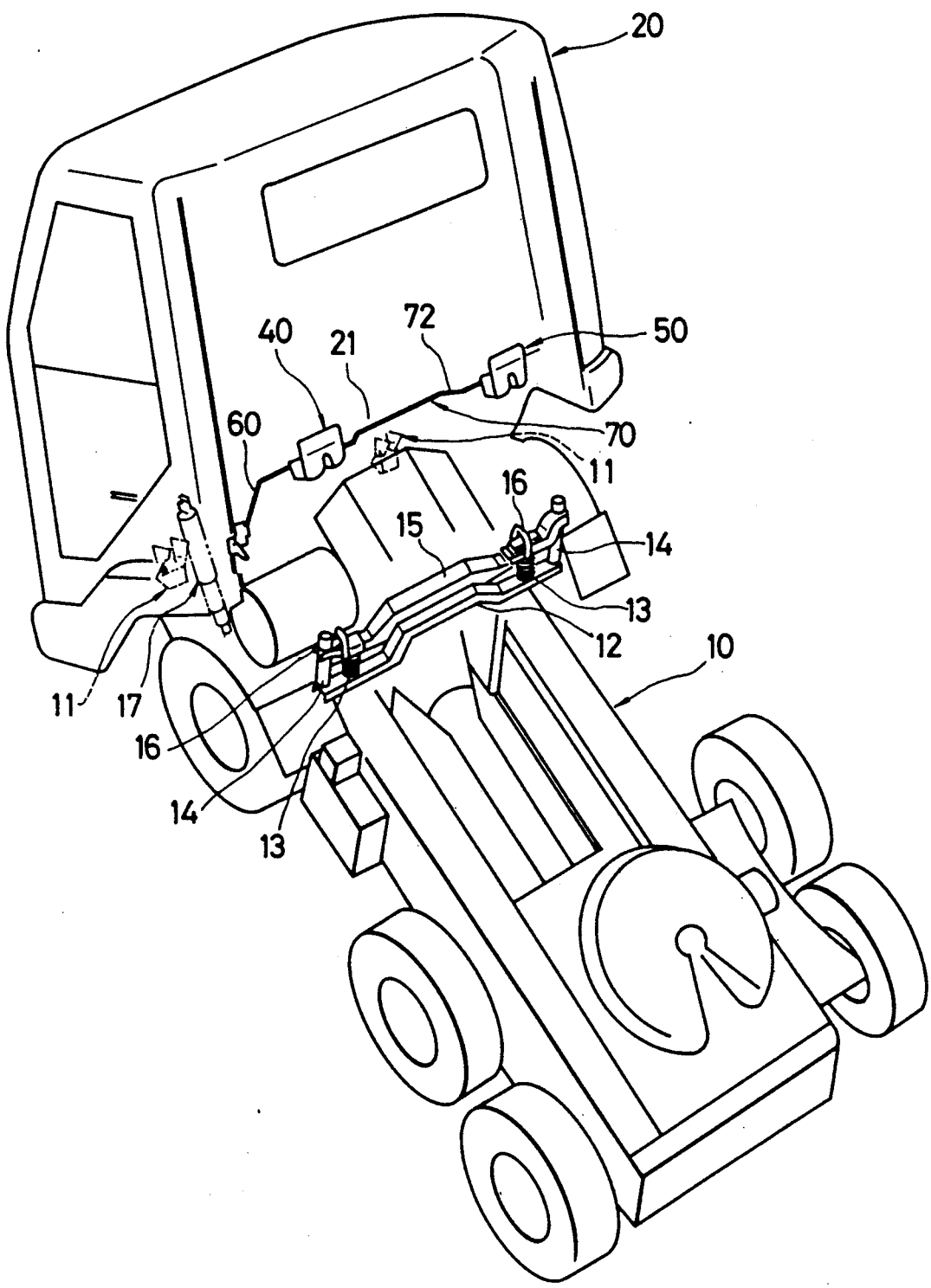
FIG. 2 is a perspective view, with parts omitted, of a truck, showing the manner in which the cab locking apparatus is attached to the truck.

The principles of this invention are particularly useful when embodied in a cab locking apparatus such as shown in FIGS. 1 and 2.

As shown in FIGS. 1 and 2, a cab 20 is pivotally mounted on a front end of a truck chassis 10 by a hinge 11 and is pivotally movable between a normal standing position and a forwardly inclined position.

A main frame 12 is mounted on the chassis 10 along a lower rear end portion 21 of the cab 20, and on the main frame 12, an auxiliary frame 15 is supported via a pair of springs 13, 13 and a pair of suspensions 14, 14. To the auxiliary frame 15 a pair of strikers 16, 16 are fixedly connected. Forwardly of the main frame 12, a hydraulic cylinder 17 is disposed for pushing the lower rear end portion 21 upwardly of the cab 20 to pivotally move from the normal standing position to the forwardly inclined position.

For engagement with the respective strikers 16, 16, a motive lock mechanism 40 and a following lock mechanism 50 are located at the lower rear end portion of the cab 20. The motive and following lock mechanisms 40, 50 are substantially alike in construction; therefore, the detailed description of the following lock mechanism 50 is omitted here for clarity.

The motive lock mechanism 40 includes a base plate 41 fixedly mounted on the lower rear end portion 21 of the cab 20. A latch member 42 is pivotally supported on the base plate 41 by a pivot 41a for pivotal movement between a locking position in which the latch member 42 is engaged with the striker 16 and an unlocking position in which the latch member 42 is removed from the striker 16. The latch member 42 is normally urged from the locking position toward the unlocking position by a spring 43 wound around the pivot 41a.

Further, a motive locking plate 44 is pivotally supported on the base plate 41 by a pivot 41b for pivotal movement between a restricting position in which a lock portion of the motive locking plate 44 engages a free end 42a of the latch member 42 to prevent the latch member 42 from being pivotally moved from the locking position, and a releasing position in which the lock portion 44a is removed from the free end 42a of the latch member 42 to release the latch member 42. The motive locking plate 44 is normally urged from the releasing position toward the restricting position by a spring 45 wound around the pivot 41b.

An input lever 46 is pivotally movably connected at its base portion 46a to the free end 44b of the motive locking plate 44. The input lever 46 has in its distal end portion a through opening 46b, through which a connecting pivot portion 61 formed by bending a distal end portion of an operating lever 60 is pivotally movably inserted.

On a base portion of the operating lever 60, a handle portion 62 is formed, and a lock member 63 is pivotally mounted near the handle portion 62. The handle portion 62 is hooked by the lock member 63 and is thereby prevented from being drawn from the locking operative position (inner side) toward the releasing operative position (outer side). The lock member 63 is normally urged by a spring 64 in such a direction as to hook the handle portion 62.

The base plate 41 has a substantially horizontally extending groove 48, in which the connecting pivot 61 is inserted. When the input lever 46 is reciprocatingly moved by operating the operating lever 60, the connecting pivot 61 is moved in and along the groove 48 in response to the reciprocating movement of the input lever 46.

The groove 48 has a restricting/releasing holding groove portion 49. When the operating lever 60 is moved from the locking operative position to the releasing operative position by the biasing force of the spring 45 via the motive locking plate 44 and the input lever 46 in order to hold the motive locking plate 44 in the releasing position via the input lever 46, the connecting pivot 61 is retained in the groove portion 49. And when the latch member 42 is pivotally moved from the unlocking position to the locking position in order that the motive locking plate 44 is pivotally moved from the releasing position to the restricting position under the biasing force of the spring 45, the connecting pivot 61 is hit by the free end 42a of the latch member 42 and is thereby removed from the groove portion 49.

The motive locking plate 44 has at the free end 44b thereof a locking flange 44c which is engageable with a cutout 41c of the base plate 41 when the motive locking plate 44 is pivotally moved from the releasing position to the restricting position.

The motive locking plate 44 also has at the free end 44b thereof a connecting hole 44d in which a base portion 71 of a connecting rod 70 is pivotally movably inserted. A distal end portion of the connecting rod 70 extends to the following lock mechanism 50.

Figure 3:
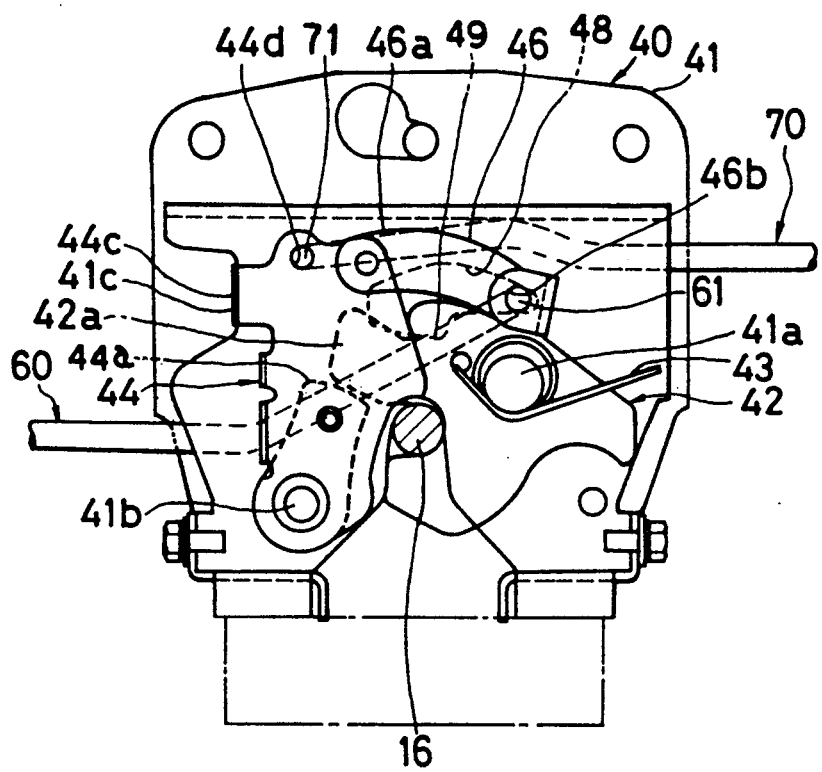
FIGS. 3 through 5 are fragmentary front elevational views of FIG. 1, showing the operation of the motive lock mechanism.
Figure 4:
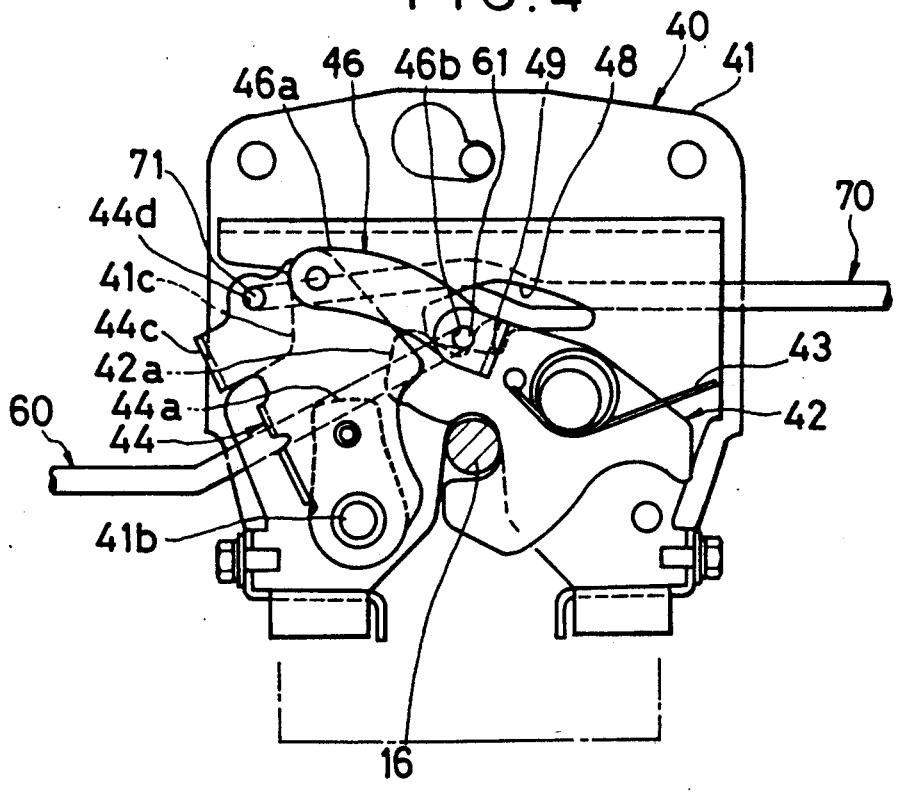

As shown in FIGS. 2 and 3, the following lock mechanism 50, like the motive lock mechanism 40, includes a non-illustrated latch member and a nonillustrated following locking plate. To the free end of the following locking plate, the distal end 72 of the connecting rod 70 is connected.

In operation, in FIG. 3, the latch member 42 is in the locking position where the latch member 42 is engaged with the striker 16 and is prevented, by the motive locking plate 44 whose lock portion 44a is in contact with the free end 42a of the latch member 42, from being pivotally moved from the locking position. Likewise, the latch member of the following lock mechanism 50 is prevented by the following locking plate from being pivotally moved from the locking position.

Thus both the motive lock mechanism 40 and the following lock mechanism 50 assume a locking posture. At that time, the lock member 63 is in its hooking position and hooks the handle portion 62 of the operating lever 60, preventing the handle portion 62 from being drawn from the hooking position.

Now when the lock member 63 is pivotally moved from the hooking position to the unhooking position against the biasing force of the spring 64 to draw the handle portion 62 of the operating lever 60 outwardly, the connecting pivot 61 of the operating lever 60 is moved in the long groove 48 from one end to the other end. The motive locking plate 44 is thereby pivotally moved from the restricting position to the releasing position via the input lever 46. And the connecting pivot 61 of the operating lever 60 is retained in the restricting/releasing holding groove portion 49 so as not to return from the other end to one end.

When the motive locking plate 44 is pivotally moved to the releasing position, the following locking plate is pivotally moved from the resting position to the releasing position via the connecting rod 70.

With both the motive locking plate 44 and the following locking plate in the released position, the latch member 42 is allowed to pivotally move to the unlocking position under the biasing force of the spring 43. Likewise, the non-illustrated latch member of the following lock mechanism 50 is allowed to pivotally move to the unlocking position under the biasing force of a non-illustrated spring.

Then when the lower rear end portion 21 of the cab 20 is pushed upwardly by the hydraulic cylinder 17, the latch member 42 of the motive lock mechanism 40 and the non-illustrated latch member of the following lock mechanism 50 are removed from the respective strikers 16, 16 and are thereby allowed to be forwardly inclined.

With the operating lever 60 in the releasing operative position, when both the motive locking plate 44 and the following locking plate are in the releasing position, the connecting pivot 61 of the operating lever 60 is retained in the restricting/releasing holding groove portion 49 so that the motive locking plate 44 is prevented from returning to the restricting position under the biasing force of the spring 45.

Subsequently, when the operating lever 60 is pushed inwardly to the locking operative position, the connecting pivot 61 of the operating lever 60 is disengaged from the restricting/releasing holding groove portion 49 and is thereby allowed to move to the locking operative position.

Figure 5:
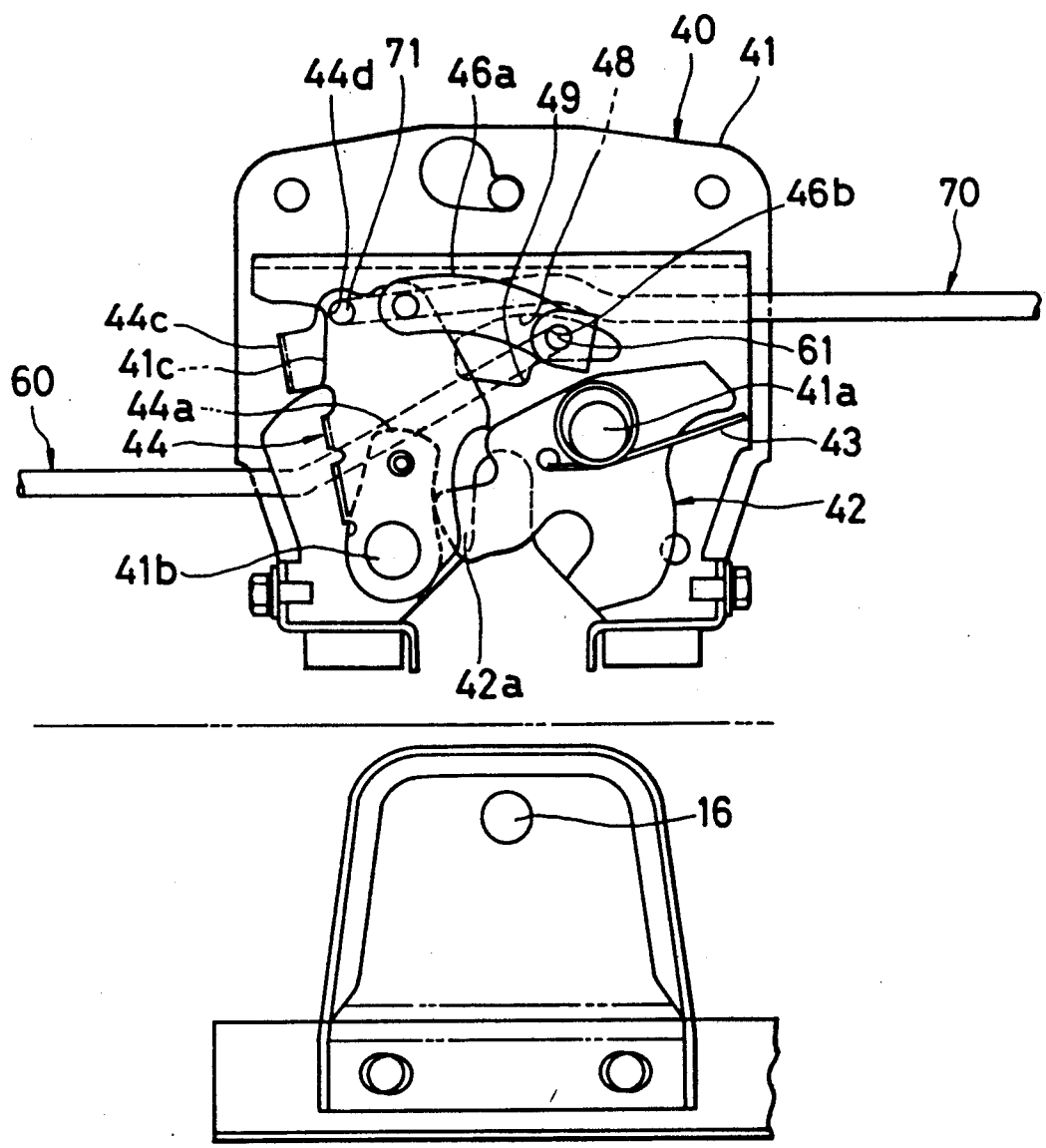

FIG. 5 shows the cab 20 in the forwardly inclined position, in which the latches 42, 52 are removed from the respective strikers 16, 16. In FIG. 5, when the operating lever 60 is pushed inwardly to the locking operative position, the motive locking plate 44 is intended to pivotally move from the releasing position to the restricting position via the input lever 46. If the motive locking plate 44 is intended to pivotally move to the restricting position, the free end 42a of the latch member 42 is brought in contact with the lock portion 44a of the motive locking plate 44 to thereby prevent the motive locking plate 44 from being pivotally moved to the restricting position. And the operating lever 60 also is prevented from being pushed toward the locking operative position. Of course, the non-illustrated following locking plate is also prevented from being pivotally moved to the restricting position.

With the cab 20 in the forwardly inclined position, the locking plate does not return to the locking position even by the foregoing operation so that the lock mechanism 40, for example, is prevented from being damaged even when the cab 20 is inadvertently moved from the forwardly inclined position to the normal standing position.

When the cab 20 is moved from the forwardly inclined position to the normal standing position, the latch member 42 is pushed by the striker 16 to pivotally move to engage the striker 16, thus assuming the locking position.

Then when the latch member 42 is pivotally moved from the locking position, the free end 42a of the latch member 42 hits the connecting pivot 61 of the operating lever 60 from the lower side thereof to remove the connecting pivot 61 from the restricting/releasing holding groove portion 49. With the connecting pivot 61 removed from the groove portion 49, the motive locking plate 44 is returned to the restricting position, and the operating lever 60 is returned to the locking operative position.

When the motive locking plate 44 is pivotally moved from the releasing position to the restricting position, the following locking plate is pivotally moved via the connecting rod 70 to assume the restricting position.

As a result, the lock portion 44a of the motive locking plate 44 comes into contact with the free end 42a of the latch member, and the latch member 42 is restricted in the locking position where the latch member 42 engages the striker 16. Meanwhile, the lock portion of the non-illustrated following locking plate comes into contact with the free end of the non-illustrated latch member, and the latch member is restricted in the locking position where the same latch member engages the striker 16. Therefore, it is possible to retain the cab 20 on the chassis 10 reliably.

With the cab locking apparatus of the illustrated embodiment, since the motive locking plate 44 is prevented from being pivotally moved to the restricting position even when the connecting pivot 61 of the operating lever 60 is removed from the restricting/releasing holding groove portion 49 of the long groove 48 for some cause, an improved degree of safety can be guaranteed.

According to this invention, partly since the latch member will be removed from the striker when the input lever is moved to the releasing operative position, and partly since the latch member will be held in the locking position when the latch member is engaged with the striker, the height of the entire apparatus can be reduced to increase the interior space of the cab, thus improving the inhabitability. Also the bed space of the cab can be increased. Therefore the apparatus has a simple construction and hence can be produced at a reduced cost.

What is claimed is:

1. A cab locking apparatus for locking a cab, which is pivotally supported on a chassis frame and movable between a standing position and a forwardly inclined position, in the standing position by engagement with a striker, which is secured to the chassis frame downwardly of a rear end of the cab, so as to prevent the cab from moving toward the forwardly inclined position, said apparatus comprising:

(a) a base plate adapted to be supported on the chassis downwardly of the rear end of the cab;

(b) a latch member pivotally connected to said base plate and pivotally movable between a locking position in which said latch member is engaged with said striker and an unlocking position in which said latch member is removed from said striker, said latch member being normally urged from said locking position toward said unlocking position;

(c) a locking plate pivotally connected to said base plate and pivotally movable between a restricting position in which said locking plate prevents said latch member from being moved from said locking position, and a releasing position in which said locking plate releases said latch member, said locking plate being normally urged from said releasing position toward said restricting position;

(d) an input lever disposed between said latch member and said locking plate, which are vertically spaced apart, said input lever being movable between a locking operative position and a releasing operative position for pivotally moving said locking plate between said restricting position and said releasing position; and (e) said base plate having a groove engageable with said input lever to hold said locking plate in said releasing position, when said input lever is moved from said locking operative position to said releasing operative position, so as to prevent said input lever from returning to said locking operative position, said groove being removable from said input lever to allow said locking plate to move from said releasing position to said restricting position under a biasing force when said latch member is pivotally moved from said unlocking position to said locking position.

2. A cab locking apparatus according to claim 1, wherein said locking plate has a lock portion which is engageable with a free end of said latch member, when the cab is in the forwardly inclined position, so as to prevent said locking plate from moving from said releasing position toward said restricting position when said locking plate is pivotally moved to said releasing position and when said latch member is pivotally moved to said unlocking position under the biasing force.

3. A cab locking apparatus according to claim 1, further comprising:
(a) an operating lever connected at one end to said locking plate for causing said locking plate to pivotally move between said restricting position and said releasing position, said operating lever having at the other end a handle portion;
(b) a lock member operatively connected to said operating lever and pivotally movable between a hooking position in which said lock member hooks said handle portion to prevent said operating lever from being drawn from said locking operative position to said releasing operative position, and an unhooking position in which said lock member unhooks said handle portion to allow said operating lever to be drawn from said locking operative position to said releasing operative position; and
(c) means for normally urging said lock member to pivotally move toward said hooking position.

4. A cab locking apparatus according to claim 1, which further comprises a pin for pivotally supporting said latch member on said base plate and a coil spring which is wound around said pin with an end thereof resting on said latch member and another end thereof being connected to the base plate, for urging said latch member from the locking position toward the unlocking position.

5. A cab locking apparatus according to claim 1, which further comprises a pin for pivotally supporting said locking plate on said base plate and a coil spring which is wound around said pin with one end thereof resting on the locking plate and another end being connected to the base plate, for urging said locking plate from the releasing position toward the restricting position.

6. A cab locking apparatus according to claim 1, wherein said latch member having a portion for engagement with said locking plate thereby being kept in its locking position and a portion slidably abuttable against the locking plate for preventing the locking plate from returning to its restricting position as the latch member is returned from its locking position to its unlocking position.

7. A cab locking apparatus according to claim 1, which further comprises an operating lever having a connecting pin portion which is connected to one end of the input lever whose other end is connected to said locking plate;
an elongated groove formed along a plane of the base plate for receiving said connecting pin portion of the operating lever allowing its movement within the groove according to a movement of the input lever when it is moved between the locking operative position and the releasing operative position;
said elongated groove having a restricting/releasing holding groove portion for retaining the connecting pin portion therein when the operating lever is moved from the locking operative position to the releasing operative position by the biasing force via the locking plate and the input lever in order to hold the locking plate in the releasing position via the input lever, while the connecting pin portion being removed therefrom upon hitting thereof by the latch member when the latch member is moved from the unlocking position to the locking position in order that the locking plate is moved from the releasing position to the restricting position under the biasing force.

8. A cab locking apparatus according to claim 7, wherein said restricting/releasing holding groove portion has a configuration that the connecting pin portion is not capable of being removed therefrom by the biasing force urging said locking plate to the locking position and it is capable of being removed therefrom when said operating lever is operated for moving said locking plate to the restricting position.

* * * * *